United States Patent
Kwon et al.

(10) Patent No.: US 9,770,999 B2
(45) Date of Patent: Sep. 26, 2017

(54) CONTROL METHOD OF COOLING WATER PUMP OF FUEL CELL VEHICLE

(71) Applicants: Hyundai Motor Company, Seoul (KR); Kia Motors Corporation, Seoul (KR)

(72) Inventors: Sang Uk Kwon, Gyeonggi-do (KR); Seon Hak Kim, Gyeonggi-do (KR); Sung Gone Yoon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/097,455

(22) Filed: Apr. 13, 2016

(65) Prior Publication Data
US 2017/0166082 A1    Jun. 15, 2017

(30) Foreign Application Priority Data
Dec. 14, 2015  (KR) .......... 10-2015-0178637

(51) Int. Cl.
*B60L 11/18* (2006.01)
*H01M 8/04* (2016.01)
(Continued)

(52) U.S. Cl.
CPC ....... *B60L 11/1892* (2013.01); *H01M 8/0488* (2013.01); *H01M 8/0491* (2013.01);
(Continued)

(58) Field of Classification Search
CPC ......... H01M 8/04303; H01M 8/04358; H01M 8/04365; H01M 8/04701; H01M 8/04723;
(Continued)

(56) References Cited

U.S. PATENT DOCUMENTS

2007/0231643 A1*  10/2007  Yamaga ............ H01M 8/04014
                                                   429/431
2010/0323261 A1*  12/2010  Igarashi ............ H01M 8/04029
                                                   429/436

FOREIGN PATENT DOCUMENTS

JP         2007-165080 A      6/2007
JP         2007165080 A  *    6/2007
(Continued)

OTHER PUBLICATIONS

J-Plat Pat Machine Translation of the detailed description of JP 2007-165080A (Jun. 2007).*

*Primary Examiner* — Gregg Cantelmo
(74) *Attorney, Agent, or Firm* — Mintz Levin Cohn Ferris Glovsky and Popeo, P.C.; Peter F. Corless

(57) ABSTRACT

A control method of a cooling water pump of fuel cell vehicle is provided. The method includes comparing a derived temperature value, including a cooling water temperature of a fuel cell or an estimated temperature of a stack of the fuel cell, with predetermined temperature criteria and comparing a required output value of the stack of the fuel cell with predetermined output criteria. The cooling water pump is then operated in a normal mode when the derived temperature value is greater than the temperature criteria or when the required output value is greater than the output criteria. Additionally, the cooling water pump is operated in a stop mode when the derived temperature value is less than the temperature criteria and, simultaneously, when the required output value is less than the output criteria.

15 Claims, 2 Drawing Sheets

(51) Int. Cl.
*H01M 8/04701* (2016.01)
*H01M 8/0432* (2016.01)
*H01M 8/04858* (2016.01)
*H01M 8/04303* (2016.01)
*H01M 8/04955* (2016.01)
*H01M 8/04992* (2016.01)
*H01M 8/04828* (2016.01)

(52) U.S. Cl.
CPC ..... *H01M 8/0494* (2013.01); *H01M 8/04303* (2016.02); *H01M 8/04358* (2013.01); *H01M 8/04365* (2013.01); *H01M 8/04701* (2013.01); *H01M 8/04723* (2013.01); *H01M 8/04731* (2013.01); *H01M 8/04865* (2013.01); *H01M 8/04895* (2013.01); *H01M 8/04925* (2013.01); *H01M 8/04955* (2013.01); *H01M 8/04992* (2013.01)

(58) Field of Classification Search
CPC ......... H01M 8/04731; H01M 8/04865; H01M 8/0488; H01M 8/04895; H01M 8/0491; H01M 8/04925; H01M 8/0494; H01M 8/04955; H01M 8/04992; B60L 11/1892
See application file for complete search history.

(56) References Cited

FOREIGN PATENT DOCUMENTS

| | | | |
|---|---|---|---|
| JP | 2008312343 A | * | 12/2008 |
| JP | 2014-225399 A | | 12/2014 |
| KR | 2014-0000634 A | | 1/2012 |
| KR | 2012-0053137 A | | 5/2012 |
| KR | 2015-0020952 A | | 2/2015 |
| KR | 2015-0077695 A | | 7/2015 |

* cited by examiner

CONTROL METHOD OF COOLING WATER PUMP OF FUEL CELL VEHICLE

CROSS-REFERENCE TO RELATED APPLICATION

This application claims the priority benefit of Korean Patent Application No. 10-2015-0178637, filed on Dec. 14, 2015, in the Korean Intellectual Property Office, the disclosure of which is incorporated herein by reference.

BACKGROUND

1. Field of the Invention

The present invention relates to a control method of a cooling water pump of a fuel cell vehicle in which the on/off and revolutions per minute (RPM) of the cooling water pump are controlled more accurately based on the stack temperature and required output of the fuel cell vehicle to prevent flooding of the fuel cell vehicle and to improve acceleration response of a stack and cell temperature uniformity.

2. Description of the Related Art

A fuel cell is a device that generates electricity by electrochemical reactions between hydrogen and oxygen, and the fuel cell has high efficiency and minimal discharge of contaminants, as compared to conventional power generation methods. In general, in such a fuel cell, hydrogen is supplied to an anode, oxide gas including oxygen is supplied to a cathode, and electrons move by reactions through an electrolyte membrane to generate electricity. Particularly, heat of reaction is generated from the fuel cell due to such exothermic reactions.

The temperature of a fuel cell module is increased by a heating value generated through such a method and performance of the fuel cell may be lowered due to deterioration of unit cells of the fuel cell. Particularly, among fuel cells, a proton exchange membrane (PEM) type fuel cell applied to middle and small capacities has an operation temperature of about 60° C. to 80° C., performs cooling and heat discharge to maintain efficiency and stability of the fuel cell, and requires a cooling device to adjust temperature for recovering excessive heat or supplying heat during starting. Such a fuel cell cooling device may include an air cooling device or a water cooling device configured to supply cooling water to dissipate heat generated from a fuel cell module.

However, in this case, heat of reaction generated from the fuel cell module may not be actively adjusted and it may be difficult for such a fuel cell cooling device to effectively cope with temperature change caused by variation of load of the fuel cell. Further, for a system that includes a heat exchanger to cool cooling water, when performance of the heat exchanger is reduced, it may be difficult to stably drive the cooling system. Therefore, to stably drive a fuel cell, a cooling device which may effectively cope with temperature change of the fuel cell module is required.

Various methods for effectively cooling a fuel cell vehicle have been developed. For example, a method in the prior art provides a method which elongates the limitation current arrival time of a vehicle to improve output stability of a stack when the temperature of the stack is increased, and improves durability of an ion filter, into which cooling water of a high temperature is introduced.

However, even using the above method, flooding due to inefficiency of the cooling system of the fuel cell vehicle may still occur and, in a low temperature state of the fuel cell vehicle, the temperature of the fuel cell stack may not be determined accurately and thus efficiency in control of the fuel cell cooling system may decrease.

The above description has been provided to aid in understanding of the background of the present invention and should not be interpreted as conventional technology known to those skilled in the art.

SUMMARY

Therefore, the present invention provides a control method of a cooling water pump of a fuel cell vehicle which may prevent the temperature of a fuel cell from decreasing during driving of the fuel cell vehicle, minimize loss of fuel efficiency, increase the temperature of a fuel cell stack to a target temperature, and maintain the increased temperature.

In accordance with the present invention, the above and other objects may be accomplished by the provision of a control method of a cooling water pump of a fuel cell vehicle including comparing, by a controller, a derived temperature value, including a cooling water temperature of a fuel cell or an estimated temperature of a fuel cell stack, with predetermined temperature criteria, comparing, by the controller, a required output value of the stack of the fuel cell with predetermined output criteria, operating, by the controller, the cooling water pump of the fuel cell in a normal mode when the derived temperature value is greater than the temperature criteria or when the required output value is greater than the output criteria, and operating, by the controller, the cooling water pump of the fuel cell in a stop mode when the derived temperature value is less than the temperature criteria and, simultaneously, if the required output value is less than the output criteria.

In the comparison of the derived temperature value with the predetermined temperature criteria and the comparison of the required output value with the predetermined output criteria, the controller may be configured to prepare a plurality of temperature criteria and a plurality of output criteria and compare the derived temperature value and the required output value with the temperature criteria the output criteria. Additionally, in the operation of the cooling water pump in the normal mode and operation of the cooling water pump in the stop mode, the controller may be configured to operate the cooling water pump in the normal mode when the derived temperature value or the required output value is comparatively high and operate the cooling water pump in the stop mode when the derived temperature value and the required output value are comparatively low.

The controller may further be configured to compare the derived temperature value with a first temperature criterion and a second temperature criterion that is less than the first temperature criterion, in the comparison of the derived temperature value with the predetermined temperature criteria, and compare the required output with a first output criterion and a second output criterion that is less than the first output criterion, in the comparison of the required output value with the predetermined output criteria.

In the operation of the cooling water pump in the normal mode, the controller may be configured to operate the cooling water pump of the fuel cell when the derived temperature value is greater than the first temperature criterion, when the derived temperature value is greater than the second temperature criterion and the required output value is greater than the second output criterion, or when the required output value is less than the first output criterion, and, in the normal mode, the controller may be configured to release limitation of the output of the fuel cell or operate the cooling water pump using the cooling water temperature of the fuel cell.

Furthermore, in the operation of the cooling water pump in the stop mode, the controller may be configured to operate the cooling water pump of the fuel cell when the derived temperature value is less than the first temperature criterion and the required output value is less than the second output criterion or when the derived temperature value is less than the second temperature criterion and the required output value is less than the first output criterion.

The operation of the cooling water pump in the stop mode may include operating the cooling water pump of the fuel cell in a minimum RPM mode when the derived temperature value is less than the second temperature criterion and the required output value is greater than the second output criterion and is less than the first output criterion.

The control method may further include operating, by the controller, the cooling water pump of the fuel cell in a re-start mode when the fuel cell satisfies pump re-start conditions, after operating the cooling water pump in the stop mode. The pump re-start conditions may be that the estimated temperature of the stack of the fuel cell exceeds a third temperature criterion that is greater than the first temperature criterion. The pump re-start conditions may be that a torque required by the fuel cell vehicle exceeds a predetermined limitation torque.

Additionally, the pump re-start conditions may be that the heating value of the fuel cell exceeds a predetermined limitation heating value. The pump re-start conditions may be that the required output value of the stack of the fuel cell is greater than the second output criterion and the estimated temperature of the stack of the fuel cell exceeds a fourth temperature criterion that is greater than the second temperature criterion.

Further, the pump re-start conditions may be that the stop mode maintenance time of the cooling water pump exceeds a predetermined pump start reference time. The pump start reference time may be gradually decreased as the frequency of cell voltage deviations of the fuel cell generated in the stop mode of the cooling water pump increases. The pump start reference time may be gradually decreased as the frequency of current of the fuel cell generated in the stop mode of the cooling water pump increases. The pump start reference time may be gradually decreased as the frequency of high voltage exposure of the fuel cell generated in the stop mode of the cooling water pump increases.

In the re-start mode, the controller may be configured to limit the output of the fuel cell to a predetermined output limitation value. In addition, the controller may be configured to operate the cooling water pump using a greater value out of the cooling water temperature of the fuel cell and the estimated temperature of the stack of the fuel cell. The control method may further include operating, by the controller, the cooling water pump of the fuel cell to enter the normal mode when the fuel cell satisfies normal mode entrance conditions, after the operation of the cooling water pump in the re-start mode.

The normal mode entrance conditions may be that the RPM of the cooling water pump is a predetermined normal RPM criterion or greater and the cooling water temperature is a predetermined normal temperature criterion or greater.

The estimated temperature of the stack may be acquired using the equation below.

$$T = \int \frac{Q}{M} + T_{init}, Q = (V_{ihv} \cdot numberofcells - V_s) \cdot I_{final} + q$$

wherein, T is an estimated temperature value of the stack of the fuel cell, Q is a heating value, M is a heat capacity, $T_{init}$ is an initial temperature of the stack of the fuel cell, $V_{ihv}$ is unit cell voltage corresponding to a lower heating value, $V_s$ is a total voltage value of the fuel cell, $I_{final}$ is a current value of the fuel cell, q is a heating value by direct reactions between hydrogen and oxygen through hydrogen crossover, and, in the above equation, the current value of the fuel cell, the heating value by direct reactions between hydrogen and oxygen through hydrogen crossover, or the total voltage value of the fuel cell may vary based on operating states of the fuel cell.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
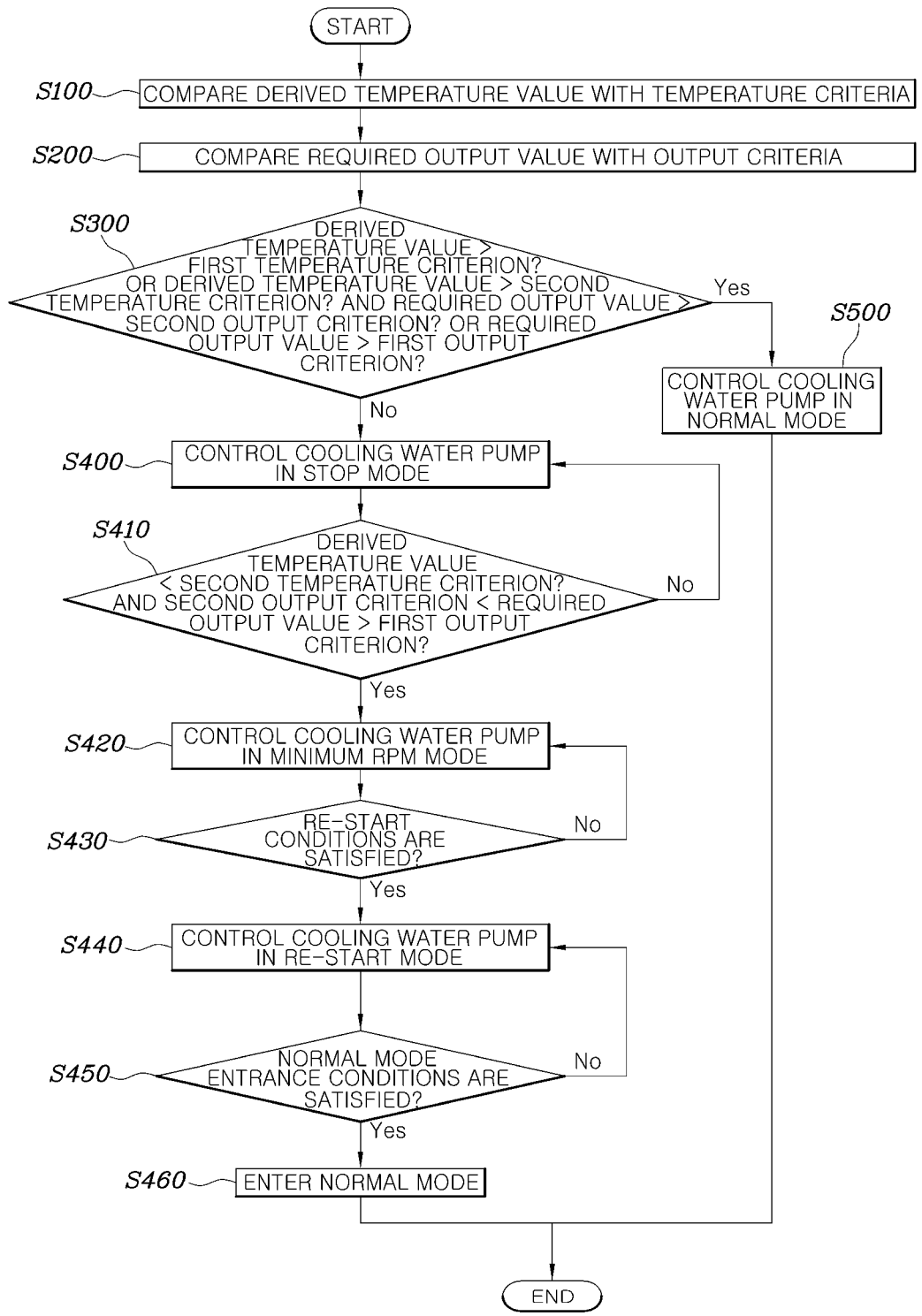
FIG. 1 is a flowchart illustrating a control method of a cooling water pump of a fuel cell vehicle in accordance with one exemplary embodiment of the present invention.
Figure 2:
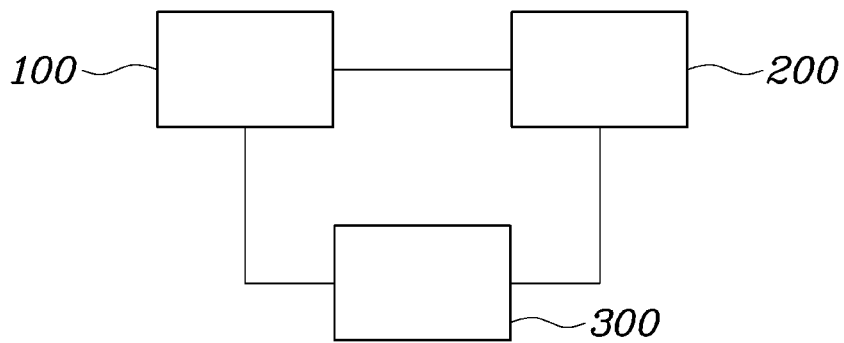
FIG. 2 is a block diagram of a control method of a cooling water pump of a fuel cell vehicle in accordance with one exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. Wherever possible, the same reference numbers will be used throughout the drawings to refer to the same or like parts.

As exemplarily shown in FIG. 1, a control method of a cooling water pump 200 of a fuel cell vehicle in accordance with one exemplary embodiment of the present invention may include comparing, by a controller 300, a derived temperature value including a cooling water temperature of a fuel cell 100 or an estimated temperature of a stack of the fuel cell 100 with predetermined temperature criteria (S100), comparing, by the controller 300, a required output value of the stack of the fuel cell 100 with predetermined output criteria (S200), operating, by the controller 300, the cooling water pump 200 of the fuel cell 100 in a normal mode when the derived temperature value is greater than the temperature criteria or when the required output value is greater than the output criteria (S500), and operating, by the controller 300, the cooling water pump 200 of the fuel cell 100 in a stop mode when the derived temperature value is less than the temperature criteria and, simultaneously, when the required output value is less than the output criteria (S400).

Since the operation of the cooling water pump 200 of the fuel cell 100 reduces heat generated from the stack of the fuel cell 100 (or to increase the temperature of the fuel cell 100 in a low temperature state), the temperature and the required output value of the stack of the fuel cell 100 are proposed as criteria to operate the cooling water pump 200 in the present invention. In general fuel cell vehicle control, when the temperature of the stack of the fuel cell 100 is derived, the cooling water temperature is used, but, sometimes, a situation in which the temperature of the stack of the fuel cell 100 is not accurately reflected in the cooling water temperature may occur.

Therefore, in the present invention, in such a situation, the cooling water temperature of the fuel cell 100 may be omitted (e.g., not used), and the cooling water pump 200 may be operated more accurately using a method of estimating the temperature of the stack of the fuel cell 100 proposed in the present invention to thus improve efficiency of the fuel cell vehicle. In particular, the method for deriving the estimated temperature of the stack of the fuel cell 100 using the equation below will be described.

$$T = \int \frac{Q}{M} + T_{init}, Q = (V_{ihv} \cdot numberofcells - V_s) \cdot I_{final} + q$$

wherein, T is an estimated temperature value of the stack of the fuel cell 100, Q is a heating value, M is a heat capacity, $T_{init}$ is an initial temperature of the stack of the fuel cell 100, $V_{ihv}$ is unit cell voltage that corresponds to a lower heating value, $V_s$ is a total voltage value of the fuel cell 100, $I_{final}$ is a current value of the fuel cell 100, and q is a heating value by direct reactions between hydrogen and oxygen through hydrogen crossover.

In particular, T is an estimated temperature value of the stack of the fuel cell 100, desired to be acquired in the present invention, and the unit of T is ° C. Since the lower heating value is the lower heating value of the fuel cell 100, $V_{ihv}$ is the unit cell voltage of the fuel cell 100 when the fuel cell 100 corresponds to the lower heating value. Further, hydrogen crossover indicates that excess hydrogen at the anode of the fuel cell 100 moves toward the cathode of the fuel cell 100 and reacts with oxygen at the cathode. In other words, heat is generated due to combination between hydrogen and oxygen even when the amount of heat is minimal, and, thus, the generated heat is reflected in the estimated temperature of the stack.

In particular, the heating value by direct reactions between hydrogen and oxygen through hydrogen crossover may be derived by multiplying the number of cells by the unit cell voltage that corresponds to the lower heating value and crossover current when the voltage of the fuel cell 100 exceeds a predetermined crossover voltage criterion, and becomes about 0 when the voltage of the fuel cell 100 is the crossover voltage criterion or less. The crossover voltage criterion may be a voltage increasing from the voltage of the fuel cell 100 at which there is a possibility of moving hydrogen at the anode toward the cathode, and may have various values based on the type of fuel cell 100.

Further, in the above equation, the current value of the fuel cell 100 indicates a current value output from the fuel cell 100. In the present invention, the current value output from the fuel cell 100 may be used in a method in which an offset current generated due to a difference between the voltage of the fuel cell 100 and voltage of a bus terminal of the fuel cell 100 is considered. Accordingly, the current value of the fuel cell 100 may be derived by adding offset current to the measured current value of the fuel cell 100 when the difference between the voltage of the fuel cell 100 and the voltage of the bus terminal of the fuel cell 100 exceeds a predetermined voltage error criterion, and the measured current value of the fuel cell 100 may be derived as the current value of the fuel cell 100 when the difference between the voltage of the fuel cell 100 and the voltage of the bus terminal of the fuel cell 100 is the voltage error criterion or less. Particularly, the voltage error criterion may indicate the minimum voltage difference between the fuel cell 100 and the bus terminal of the fuel cell which generates current, and such a voltage error criterion may be set in advance to have various values in the controller 300 according to the type of fuel cell 100.

In addition, in the above equation, the total voltage value of the fuel cell 100 may have an error based on a plurality of cell voltage deviations in the stack and, to correct such an error, in the present invention, the total voltage value of the fuel cell 100 may be derived by multiplexing the cell minimum voltage by the number of cells when the cell voltage deviation of the stack of the fuel cell 100 exceeds a predetermined deviation criterion, and a measured total voltage value of the fuel cell 100 may be derived as the total voltage value of the fuel cell 100 when the cell voltage deviation of the stack of the fuel cell 100 is the deviation criterion or less. Particularly, the deviation criterion may indicate a deviation criterion in which the stack cell voltage deviation is excessive and thus influences the size of the total voltage value of the fuel cell 100, and such a deviation criterion may have various values based on the type of fuel cell 100.

Therefore, the estimated temperature of the stack derived through the above method may be acquired in consideration of various variables, which may be generated from the stack of the fuel cell 100, and may thus be more accurately derived than a conventional stack temperature estimation method, thereby more effectively operating a fuel cell system.

When the more accurate temperature of the stack of the fuel cell 100 may be derived through the above method, a method for more effectively operating the cooling water pump 200 using the derived temperature of the stack will be described. Therefore, in the comparison of the derived temperature value with the temperature criteria (S100) and comparison of the required output value with the output criteria (S200) of the present invention, the controller 300 may be configured to prepare a plurality of temperature criteria and a plurality of output criteria, compare the derived temperature value and the required output value with the temperature criteria and the output criteria.

Further, in the operation of the cooling water pump 200 in the normal mode (S500) and the operation of the cooling water pump 200 in the stop mode (S400), the controller 300 may be configured to operate the cooling water pump 200 in the normal mode when the derived temperature value or the required output value is comparatively high and operate the cooling water pump 200 in the stop mode when the derived temperature value and the required output value are comparatively low. In other words, the controller 300 may be configured to determine whether the cooling water pump 200 is started using the derived temperature value and the required output value of the fuel cell vehicle. Particularly, the temperature criteria and the output criteria may have various values based on performance of the cooling water pump 200 and characteristics of the fuel cell vehicle.

Hereinafter, a method for setting temperature criteria and output criteria to start the cooling water pump 200 (e.g., in the normal mode in the present invention) or to stop the cooling water pump 200 and operating the cooling water pump 20 based on the temperature and output criteria will be described in detail.

In the present invention, a first temperature criterion and a second temperature criterion that has a value less than the first temperature criterion may be provided as the temperature criteria, and a first output criterion and a second output criterion that has a value less than the first output criterion may be provided as the output criteria. Therefore, in the present invention, the controller 300 may be configured to compare the derived temperature value with the first temperature criterion and the second temperature criterion in the comparison of the derived temperature value with the temperature criteria (S100), and compare the required output value with the first output criterion and the second output criterion in the comparison of the required output value with the output criteria (S200).

Particularly, the first temperature criterion and the second temperature criterion may have various values based on the states of the fuel cell vehicle. However, when the first and second temperature criteria are set to excessively large values or excessively small values (e.g., beyond the exemplary temperature criterion listed below), reverse effects, such as a decrease in efficiency of the fuel cell vehicle, may be generated. Therefore, the first temperature criterion may be set to about 58° C. and the second temperature criterion may be set to about 50° C. Although the first output criterion and the second output criterion may have various values according to the type of fuel cell 100, the first and second output criteria require limitations. In the present invention, an output when a torque required by the fuel cell 100 exceeds a predetermined limitation torque or when the heating value of the fuel cell 100 exceeds a predetermined limitation heating value may be set as the first output criterion, and the maximum output which the fuel cell 100 may supply during idle stop may be set as the second output criterion.

In conventional operation of a cooling water pump of a fuel cell vehicle, starting-on/off of the cooling water pump is executed based on the cooling water temperature. However, when the cooling water temperature is less than a predetermined temperature and the required output of the fuel cell vehicle is high and, thus, starting of a fuel cell is required, the cooling water pump should be started to increase the temperature of the fuel cell and thus starting of the cooling water pump is required.

Therefore, to solve such a problem, in the present invention, the controller 300 may be configured to operate the cooling water pump 200 of the fuel cell 100 in the stop mode when the derived temperature value is less than the first temperature criterion and the required output value is less than the second output criterion or when the derived temperature value is less than the second temperature criterion and the required output value is less than the first output criterion. Accordingly, when the derived temperature value is low, i.e., is within the range of the first temperature criterion to the second temperature criterion but the required output exceeds the second output criterion, the cooling water pump 200 may be started up in the normal mode, as shown in FIG. 3, and, thus, efficiency of the fuel cell 100 may be maximized.

Figure 3:
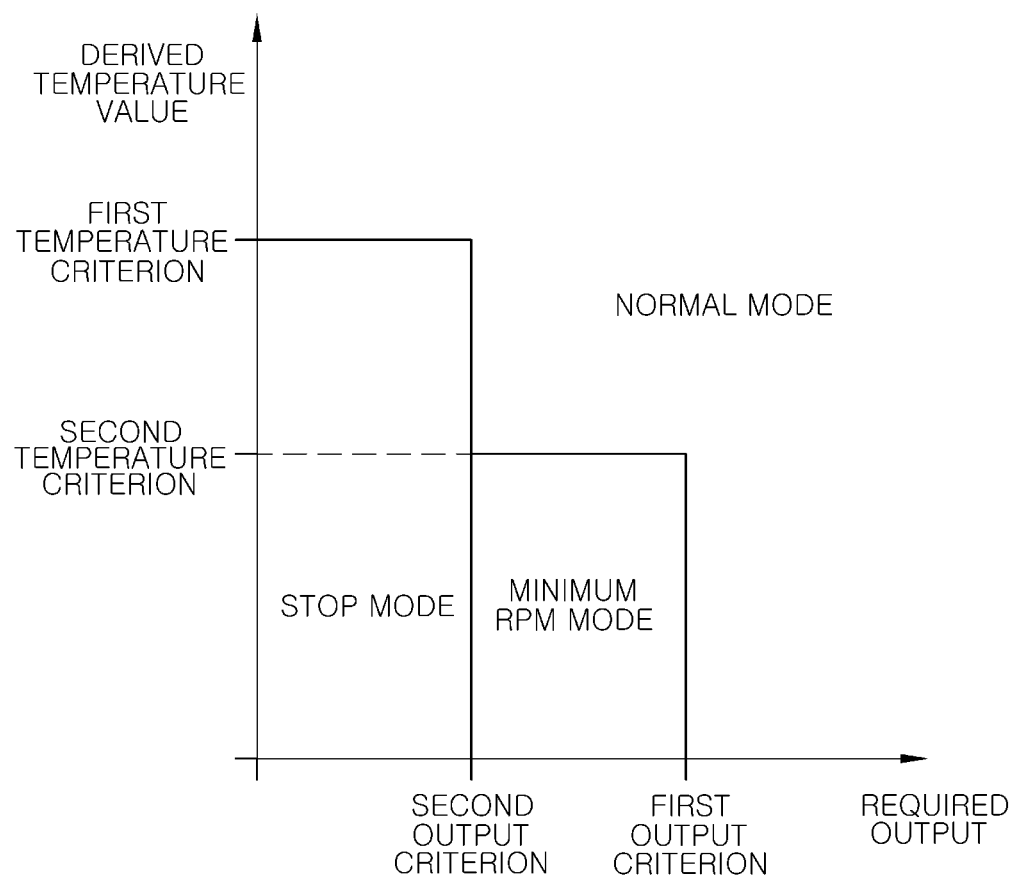
FIG. 3 is a graph illustrating operation modes according to derived temperature values and required outputs of a fuel cell vehicle in accordance with one exemplary embodiment of the present invention.

Further, as shown in FIG. 3, in the present invention, even when the cooling water pump 200 is not in the normal mode, the off state of the cooling water pump 200 may be divided into two modes based on derived temperature values and required outputs. In particular, in response to determining that minimum driving of the cooling water pump 200 is required even in the off state based on the needs of the fuel cell vehicle, the cooling water pump 200 may be started to acquire acceleration response of the fuel cell 100 and to uniformize the temperatures of the stack cells. It may be understood from FIG. 3 that the off state of the cooling water pump 200 may be divided into the stop mode and a minimum RPM mode.

In other words, when the temperature of the stack of the fuel cell 100 is less than a particular temperature (e.g., excessively low) and the required output of the fuel cell vehicle is also low and, thus, there is no possibility of increasing the temperature of the stack of the fuel cell 100 and it is unnecessary to start the cooling water pump 200, the cooling water pump 200 may be operated in the stop mode. Additionally, in response to determining a possibility of starting the cooling water pump 200 due to the required output and the temperature of the stack of the fuel cell 100, the cooling water pump 200 may be operated in the minimum RPM mode.

Moreover, a method for controlling the cooling water pump 200 will be described in detail. When the derived temperature value is less than the second temperature criterion and the required output value is greater the second output criterion and is less than the first output criterion in a section except for the normal mode (S410), as shown in FIG. 3, the controller 300 may be configured to operate the cooling water pump 200 of the fuel cell 100 in the minimum RPM mode (S420).

The cooling water pump 200 in the stop mode or the minimum RPM mode may have a substantially lower RPM and a lower limitation output of the fuel cell 100 than the cooling water pump 200 in the normal mode. Therefore, prior to starting of the cooling water pump 200 in the normal mode by satisfying designated conditions, preparation for re-starting the cooling water pump 200 may be required to improve efficiency of the fuel cell 100. Therefore, in the present invention, as shown in FIG. 1, the re-starting operation of the cooling water pump 200 may be executed between the operation of the cooling water pump 200 in the minimum RPM (S420) and entrance to the normal mode (S460) to improve efficiency of the fuel cell vehicle.

Such preparation may include determining whether the fuel cell 100 satisfies pump re-start conditions (S430) and operating the cooling water pump 200 of the fuel cell 100 in a re-start mode when the fuel cell 100 satisfies the pump re-start conditions (S440). In particular, the pump re-start conditions may be set to vary based on user tendencies and types of fuel cell vehicles. Hereinafter, five representative pump re-start conditions will be described.

First pump re-start conditions may be that the estimated temperature of the stack of the fuel cell 100 is greater than a third temperature criterion which may be greater than the first temperature criterion. When the estimated temperature of the stack of the fuel cell 100 exceeds the third temperature criterion to determine normal mode conditions, the cooling water pump 200 may be started due to the over temperature of the stack of the fuel cell 100 regardless of the required output of the vehicle and, in this case, the controller 300 may be configured to determine that it is necessary to drive the cooling water pump 200 and thus operate the cooling water pump 200 in the re-start mode. The third temperature criterion may be set to have various values based on types and states of fuel cell vehicles.

Second pump re-start conditions may be that the required torque of the fuel cell vehicle is greater than a predetermined limitation torque. Since the high torque of the fuel cell vehicle indicates that the output of the fuel cell 100 should be increased in proportion to the torque, the heating value generated from the stack of the fuel cell 100 may be increased in proportion to the increased torque and it may be necessary to start the cooling water pump 200. The limitation torque may have various values based on types and states of fuel cell vehicles and have various values based on driver tendencies (e.g., the limitation torque may be decreased when a driver has a tendency to frequently decelerate or accelerate a vehicle and be increased when a driver has a tendency to scarcely decelerate or accelerate a vehicle).

Third pump re-start conditions may be that the heating value of the fuel cell 100 is greater than a predetermined limitation heating value. Since the heating value may be a reference value based on a temperature variation of an object, the present invention proposes the pump re-start conditions using the heating value. In particular, the heating value of the fuel cell 100 may be calculated using equation Q=CmT wherein, Q is the heating value, C is the specific heat of cooling water, m is the flow rate of cooling water, and T is the temperature variation of the stack of the fuel cell 100. Further, the limitation heating value indicates the heating value of the fuel cell 100 when it may be necessary to start the cooling water pump 200. The limitation heating value may be set to have various values based on types and states of the fuel cell 100.

Fourth pump re-start conditions may be that the required output value of the stack of the fuel cell 100 is greater than the second output criterion and the estimated temperature of the stack of the fuel cell 100 is greater than a fourth temperature criterion that is greater than the second temperature criterion. When both the temperature and the required output exceed designated levels, there may be a high possibility of driving the cooling water pump 200 and thus the cooling water pump 200 may be operated in advance in the re-start mode. The fourth temperature criterion may be set have various values based on types and states of the fuel cell 100.

Finally, fifth fourth pump re-start conditions may be that the stop mode maintenance time of the cooling water pump 200 is greater than a predetermined pump start reference time. In other words, when the stop mode maintenance time of the cooling water pump 200 is greater than the pump start reference time even though conditions regarding the temperature and the required output of the fuel cell 100 are not satisfied, the cooling water pump 200 may enter the re-start mode to more easily enter the normal mode. Therefore, when the pump start reference time is set improperly, driving of the cooling water pump 200 may cause energy waste and thus decrease energy efficiency of the fuel cell vehicle. Therefore, three methods to set the pump start reference time are proposed herein.

In a first method, the pump start reference time may be set to be gradually decreased as the frequency of cell voltage deviations of the fuel cell 100 generated in the stop mode of the cooling water pump 200 increases. Since a low frequency of cell voltage deviations of the fuel cell 100 indicates that stack cell temperatures are uniformized and thus there may be a minimal possibility of starting the cooling water pump 200, a substantially long pump start reference time may be set to delay starting of the cooling water pump 200. Furthermore, since a high frequency of cell voltage deviations of the fuel cell 100 indicates a stack cell temperature deviation is high and, to uniformize the stack cell temperatures, it may be necessary to start the cooling water pump 200, a shorter pump start reference time may be set to cause the cooling water pump 200 to enter the re-start mode within a short time.

In a second method, the pump start reference time may be set to be gradually decreased as the frequency of generation of current of the fuel cell 100 generated in the stop mode of the cooling water pump 200 increases. Similarly to the first method, the temperature of the stack of the fuel cell 10 may increase due to generation of heat by the generated current, as the frequency of generation of current increases, and, to prevent temperature increase, a short pump start reference time may be set to cause the cooling water pump 200 to enter the re-start mode within a short period of time.

Finally, in a third method, the pump start reference time may be set to be gradually decreased as the frequency of high voltage exposure of the fuel cell 100 generated in the stop mode of the cooling water pump 200 increases. In the same manner as the two above-described methods, the temperature of the stack of the fuel cell 10 may increase, as the frequency of high voltage exposure increases, and, thus, a short pump start reference time may be set to cause the cooling water pump 200 to enter the re-start mode within a short period of time.

When the state of the fuel cell vehicle satisfies the five above-described pump re-starting conditions, the cooling water pump 200 of the fuel cell 100 may be operated in the re-start mode (S440). Particularly, the re-start mode is proposed to allow the cooling water pump 200 in the minimum RPM mode to more smoothly shift to the normal mode.

Although the cooling water pump 200 in the re-start mode may be executed through various methods according to types and states of fuel cell vehicles, the present invention proposes a method for controlling the cooling water pump 200 by limiting the output of the fuel cell 100 to a predetermined output limitation value and a method for controlling the cooling water pump 200 using a greater value of the cooling water temperature of the fuel cell 100 and the estimated temperature of the stack of the fuel cell 100.

In the re-start mode, the temperature of the fuel cell vehicle may not be sufficiently increased and thus it may be unnecessary to operate the cooling water pump 200 in the normal mode. Operation of the fuel cell 200 with a normal output under the above state may cause overload of the stack of the fuel cell 100. Therefore, to prevent such a situation, in the present invention, output in the re-start mode may be limited. The output limitation value may have various values based on types and states of fuel cell vehicles.

Further, the greatest reference value in the operation of the cooling water pump 200 in the re-start mode may be the cooling water temperature, as described above. However, differently from in the normal mode, the cooling water pump 200 may not be driven normally in the off state or in the re-start mode and, thus, the cooling water may not be circulated smoothly and the temperature of the cooling water may not be uniform. Therefore, operation of the cooling water pump 200 using the cooling water temperature at one point is ineffective and the present invention proposes a control method of the cooling water pump 200 in consideration of the above-described method of deriving the estimated temperature of the stack.

As exemplarily shown in FIG. 1, after operation of the cooling water pump 200 in the re-start mode (S440), the controller 300 may be configured to determine whether the fuel cell 100 satisfies normal mode entrance conditions (S450), and, in response to determining that the fuel cell 100 satisfies pump normal mode entrance conditions, the controller 300 may be configured to operate the cooling water pump 200 of the fuel cell 100 to enter the normal mode (S460). In particular, various normal mode entrance conditions may be set based on the types of fuel cell vehicles or user requests.

However, since the many important factors in starting of the cooling water pump 200 is an RPM and a cooling water temperature, the present invention proposes as the normal mode entrance conditions that the RPM of the cooling water pump 200 be a predetermined normal RPM criterion or greater and the cooling water temperature be a predetermined normal temperature criterion or greater. The normal RPM criterion and the normal temperature criterion may be set to have various values based on types and states of fuel cell vehicles and, in general, the RPM of the cooling water pump 200 and the cooling water temperature in the normal mode of the cooling water pump 200 may be set as the normal RPM criterion and the normal temperature criterion.

Although the cooling water pump 200 may be started in the normal mode through the above-described operations, the controller 300 may also be configured to operate the cooling water pump 200 of the fuel cell 100 in the normal mode, when the derived temperature value is greater than the first temperature criterion, when the derived temperature value is greater than the second temperature criterion and the required output value is greater than the second output criterion, or when the required output value is greater than the first output criterion, through S100 and S200, as shown in FIG. 1. In other words, in the present invention, the state of the cooling water pump 200 except for the stop mode and the minimum RPM mode corresponds to the normal mode starting conditions of the cooling water pump 200.

Further, the normal mode may indicate the normal state of the fuel cell vehicle and, thus, the output may not be limited. Therefore, in the preset invention, the controller may be configured to release limitation of the output of the fuel cell 100 in the normal mode of the cooling water pump 200. In addition, since cooling water may be circulated more in the normal mode, the cooling water pump 200 may be operated using the cooling water temperature of the fuel cell 100 without use of the estimated temperature of the stack derived through complex calculation.

As is apparent from the above description, a control method of a cooling water pump of a fuel cell vehicle in accordance with the present invention has effects, as follows.

First, when the cooling water pump is turned off, local overheating of a fuel cell stack may be prevented by acquiring reliability of the estimated temperature of the stack.

Second, loads serving as criteria to turn off the cooling water pump of the fuel cell may be differentiated according to temperatures and thus driving of the cooling water pump at a low temperature may be avoided, and fuel efficiency of the fuel cell vehicle may be improved through increase in the frequency of factors of high voltage pump accessories.

Third, in the off state of the cooling water pump of the fuel cell, RPMs of the cooling water pump may be divided into two modes and, thus acceleration response of the fuel cell may be acquired and uniformization of cell temperatures of the fuel cell stack may be achieved in advance.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A control method of a cooling water pump of a fuel cell vehicle, comprising:
   comparing, by a controller, a derived temperature value, including a cooling water temperature of a fuel cell or an estimated temperature of a fuel cell stack, with predetermined temperature criteria;
   comparing, by the controller, a required output value of the stack of the fuel cell with predetermined output criteria;
   operating, by the controller, the cooling water pump of the fuel cell in a normal mode when the derived temperature value is greater than the temperature criteria or when the required output value is greater than the output criteria;

operating, by the controller, the cooling water pump of the fuel cell in a stop mode when the derived temperature value is less than the temperature criteria and, simultaneously, when the required output value is less than the output criteria; and operating, by the comtroller, the cooling water pump of the fuel cell in a re-start mode when the fuel cell satisfies pump re-start conditions, after operation of the dcooling water pump in the stop mode, wherein the normal mode is a mode in which revolutions per minute (RPM) of the cooling water pump is controlled based on the cooling water temperature, wherein the pump re-start conditions are that the stop mode maintenance time of the cooling water pump exceeds a predetermined pump start reference time, and wherein the pump start reference time is gradually decreased as frequency of generation of cell voltage deviations of the fuel cell, generation of current of the fuel cell, or generation of high voltage exposure case in which the fuel cell is exposed to a voltage higher than a predetermined reference voltage in the stop mode of the cooling water pump increases.

2. The control method according to claim 1, wherein:
in the comparison of the derived temperature value with the predetermined temperature criteria and the comparison of the required output value with the predetermined output criteria, the controller is configured to prepare a plurality of temperature criteria and a plurality of output criteria and compare the derived temperature value and the required output value with the temperature criteria and the output criteria; and
in the operation of the cooling water pump in the normal mode and the operation of the cooling water pump in the stop mode, the controller is configured to operate the cooling water pump in the normal mode when the derived temperature value or the required output value is comparatively high and operate the cooling water pump in the stop mode when the derived temperature value and the required output value are comparatively low.

3. The control method according to claim 1, wherein the controller is configured to compare the derived temperature value with a first temperature criterion and a second temperature criterion that is less than the first temperature criterion, in the comparison of the derived temperature value with the predetermined temperature criteria, and compare the required output with a first output criterion and a second output criterion that is less than the first output criterion, in the comparison of the required output value with the predetermined output criteria.

4. The control method according to claim 3, wherein:
in the operation of the cooling water pump in the normal mode, the controller is configured to operate the cooling water pump of the fuel cell in the normal mode when the derived temperature value is greater than the first temperature criterion, when the derived temperature value is greater than the second temperature criterion and the required output value is greater than the second output criterion, or when the required output value is less than the first output criterion; and
in the normal mode, the controller is configured to release a limitation of the output of the fuel cell or operate the cooling water pump using the cooling water temperature of the fuel cell.

5. The control method according to claim 3, wherein, in operation of the cooling water pump in the stop mode, the controller is configured to operate the cooling water pump of the fuel cell in the stop mode when the derived temperature value is less than the first temperature criterion and the required output value is less than the second output criterion or when the derived temperature value is less than the second temperature criterion and the required output value is less than the first output criterion.

6. The control method according to claim 5, wherein the operation of the cooling water pump in the stop mode includes:
operating, by the controller, the cooling water pump of the fuel cell in a minimum revolutions per minute (RPM) mode when the derived temperature value is less than the second temperature criterion and the required output value is greater than the second output criterion and is less than the first output criterion.

7. The control method according to claim 1, wherein the pump re-start conditions are that the estimated temperature of the stack of the fuel cell is greater than a third temperature criterion that is greater than the first temperature criterion.

8. The control method according to claim 1, wherein the pump re-start conditions are that a torque required by the fuel cell vehicle is great than a predetermined limitation torque.

9. The control method according to claim 1, wherein the pump re-start conditions are that the heating value of the fuel cell is greater than a predetermined limitation heating value.

10. The control method according to claim 1, wherein the pump re-start conditions are that the required output value of the stack of the fuel cell is greater than the second output criterion and the estimated temperature of the stack of the fuel cell is greater than a fourth temperature criterion that is greater than the second temperature criterion.

11. The control method according to claim 1, wherein, in the re-start mode, the controller is configured to limit the output of the fuel cell to a predetermined output limitation value.

12. The control method according to claim 1, wherein, in the re-start mode, the controller is configured to operate the cooling water pump using a greater value between the cooling water temperature of the fuel cell and the estimated temperature of the stack of the fuel cell.

13. The control method according to claim 1, further comprising:
operating, by the controller, the cooling water pump of the fuel cell to enter the normal mode when the fuel cell satisfies normal mode entrance conditions, after the operation of the cooling water pump in the re-start mode.

14. The control method according to claim 13, wherein the normal mode entrance conditions are that the RPM of the cooling water pump is a predetermined normal RPM criterion or greater and the cooling water temperature is a predetermined normal temperature criterion or greater.

15. The control method according to claim 1, wherein the estimated temperature of the stack is acquired using the equation below:

$$T = \int \frac{Q}{M} + T_{init}, Q = (V_{ihv} \cdot numberofcells - V_s) \cdot I_{final} + q,$$

wherein T means an estimated temperature value of the stack of the fuel cell, Q means a heating value, M means a heat capacity, $T_{init}$ means an initial temperature of the stack of the fuel cell, $V_{ihv}$ means unit cell voltage corresponding to a lower heating value, $V_s$ means a total voltage value of the fuel cell, $I_{final}$ means a current value of the fuel cell, and q means a heating value by direct reactions between hydrogen and oxygen through hydrogen crossover, and wherein, in the above equation, the current value of the fuel cell, the heating value by direct reactions between hydrogen and oxygen through hydrogen crossover, or the total voltage value of the fuel cell varies based on operating states of the fuel cell.

\* \* \* \* \*